(12) United States Patent
Kang et al.

(10) Patent No.: US 11,638,953 B2
(45) Date of Patent: May 2, 2023

(54) METHOD FOR COLLECTING PARAMETERS FOR CASTING SOLIDIFICATION SIMULATION AND GRIDDED DESIGN METHOD FOR POURING AND RISER SYSTEM

(71) Applicants: SHANGHAI JIAO TONG UNIVERSITY, Shanghai (CN); ZHONGCHAO HANGYU INVESTMENT CASTING S&T CO., Yixing (CN)

(72) Inventors: Maodong Kang, Shanghai (CN); Jun Wang, Shanghai (CN); Jianzhong Li, Shanghai (CN); Guoxiang Wang, Shanghai (CN); Haiyan Gao, Shanghai (CN); Baode Sun, Shanghai (CN)

(*) Notice: Subject to any disclaimer, the term of this patent is extended or adjusted under 35 U.S.C. 154(b) by 0 days.

(21) Appl. No.: 17/585,609

(22) Filed: Jan. 27, 2022

(65) Prior Publication Data

US 2022/0143687 A1 May 12, 2022

Related U.S. Application Data

(63) Continuation of application No. PCT/CN2021/112903, filed on Aug. 17, 2021.

(30) Foreign Application Priority Data

Jun. 23, 2020 (CN) .......................... 202010595300.4

(51) Int. Cl.
*B22D 37/00* (2006.01)
*G06F 30/23* (2020.01)
(Continued)

(52) U.S. Cl.
CPC ............. *B22D 37/00* (2013.01); *G06F 30/23* (2020.01); *G06F 2113/22* (2020.01); *G06F 2119/08* (2020.01)

(58) Field of Classification Search
CPC .......... B22D 37/00; B22C 9/088; G06F 30/23
(Continued)

(56) References Cited

U.S. PATENT DOCUMENTS

2016/0034614 A1* 2/2016 Wang .................. B22D 21/007
703/2

FOREIGN PATENT DOCUMENTS

CN 101567019 A 10/2009
CN 102117358 A * 7/2011 ......... G06F 17/5018
(Continued)

OTHER PUBLICATIONS

ISR of PCT/CN2021/112903.

*Primary Examiner* — Kevin E Yoon
(74) *Attorney, Agent, or Firm* — Rumit Ranjit Kanakia

(57) ABSTRACT

The present disclosure provides a method for collecting parameters for casting solidification simulation and a gridded design method for a pouring and riser system, comprising calculating thermodynamic parameters of a superalloy; obtaining cooling curves of the superalloy with different thickness; measuring a linear expansion coefficient of the superalloy as a function of temperature; the design method comprising: simulating a solidification process with tubular features of different thickness, and determining a feeding distance of the features of different thickness; establishing a gridded pouring and riser system, dividing the casting into a plurality of modules according to the thickness, and dividing a cell inside each module, and ensuring that a size of the cell is less than the feeding distance with the thickness; simulating filling and solidification of castings and the (Continued)

gridded pouring and riser system, and analyzing simulation results of defects.

9 Claims, 1 Drawing Sheet

(51) Int. Cl.
*G06F 119/08* (2020.01)
*G06F 113/22* (2020.01)

(58) Field of Classification Search
USPC .......................................................... 700/146
See application file for complete search history.

(56) References Cited

FOREIGN PATENT DOCUMENTS

| | | | |
|---|---|---|---|
| CN | 102169518 A | | 8/2011 |
| CN | 102228973 A | | 11/2011 |
| CN | 104698030 A | | 6/2015 |
| CN | 105598379 A | | 5/2016 |
| CN | 111872324 A | | 11/2020 |
| CN | 113722964 A | * | 11/2021 |
| WO | 2009133602 A1 | | 11/2009 |

* cited by examiner

METHOD FOR COLLECTING PARAMETERS FOR CASTING SOLIDIFICATION SIMULATION AND GRIDDED DESIGN METHOD FOR POURING AND RISER SYSTEM

TECHNICAL FIELD

The present disclosure relates to the field of investment casting of superalloy, and in particular, to a method for collecting parameters for a solidification simulation of a large and complex thin-walled superalloy casting and a gridded design method for a pouring and riser system of a large and complex thin-walled superalloy casting.

BACKGROUND ART

The development of advanced aircraft engines has become one of the most urgent needs of China's aviation industry. The new generation of high thrust-weight ratio aero-engine requires very strict structural design, and requires a large number of complex structures with high structural efficiency, such as integration, lightweight, hollow thin-walled and precision. This promotes the development of superalloy investment casting to large, complex, and thin-walled characteristics. The integral investment casting technology of large and complex thin-walled superalloy castings is an important technical basis for the development of advanced aviation equipment to lightweight, precise and long-life characteristics. The traditional semi-empirical pouring and riser system design method has achieved great success in the development of small and simple thick-walled superalloy castings. There is no difference in the inherent defect formation mechanism and size evolution law in conversion from the small and simple thick-walled castings to the large and complex thin-walled castings. However, there has been qualitative change in the macro-performance of defects and sizes, and there is a "size effect", i.e. the increase of the complexity dimension of defect formation and size change law is greater than the increase of the size dimension of the castings themselves. For example, no matter how two small castings are joined, both the shape and volume fraction of their internal defects are not a simple mechanical accumulation, and the dimensional change is not a simple equivalent amplification of the shrinkage coefficient of the material body. The "size effect" of castings and the "structure effect" accompanying with the structural complexity of castings cause the local internal stress of large and complex thin-walled superalloy castings during mold filling and solidification to be very large, which often leads to three casting defects, i.e. shrinkage porosity, deformation and over-tolerance sizes. Therefore, the design method of pouring and riser system for such castings has become one of the key problems restricting the development of large and complex thin-walled superalloy castings for aerospace major equipment.

A literature search of the prior art found that: Pan Botao etc. reports the design method of a pouring and riser system for a thin-walled regulating sheet casting of superalloy in "Special-cast and Non-ferrous Alloys" (2012), no. 8, vol. 32, pp. 757-758. In general, the pouring-in-runner filling method is adopted. Two in-runners are led out from a straight-runner at a greater wall thickness difference from the straight-runner, and the molten metal is introduced into the casting mold by means of the in-runners, which also played a feeding role. It is claimed that the design of the pouring and riser system can eliminate the cold shut and misrun defects of the castings, the qualified rate of the castings is greatly improved, and the production rate of the castings is increased to about twice of the original. The disadvantage of this study is that the design method of the pouring and riser system is given only for the specific engineering castings, but for a large number of complex thin-walled superalloy castings, it is difficult to provide effective help for the foundry engineers when designing the pouring and riser system for other large and complex thin-walled superalloy castings due to the lack of general design principles. In addition, the defects of internal shrinkage porosity are not fully considered when designing the pouring and riser system.

The Chinese invention patent with the application number CN 201510009167.9 relates to a pouring system for thin-walled castings and a pouring method therefor, comprising a cavity, a straight-runner, a traversal-runner, an inner-runner and an air outlet, the straight-runner being in communication with the traversal-runner, the traversal-runner being in communication with the inner-runner, the cavity being in communication with the inner-runner, the air outlet being in communication with the cavity, the traversal-runner being divided into an upper traversal-runner and a lower traversal-runner, the upper traversal-runner being in communication with the straight-runner, the lower traversal-runner being in communication with the inner-runner, the upper traversal-runner being in communication with the lower traversal-runner through a retaining surface, and a slag collecting bag being provided at the junction of the upper traversal-runner and the retaining traversal-runner. It further discloses a pouring method for a thin-walled casting, wherein the thin-walled casting is inoculated with a stream, the pouring temperature is 1350-1400° C., and the pouring speed is 270-320 kg/min. Compared with the prior art, the method of this patent has the advantages of high yield, high production rate and low production cost of the castings under the premise of ensuring the quality of castings. The disadvantage of this patent is that the design idea of the pouring and riser system of this patent does not consider enough feeding channel, and a large number of micro-porosity defects will inevitably occur. Therefore, the method of this patent is not suitable for the pouring and riser coefficient design of complex thin-walled superalloy castings.

The Chinese invention patent with the application number CN 201710908582.7 relates to a investment casting pouring system for an aluminium alloy casting of a thin-walled conical structure. The traversal-runner is a cross runner; on each radial runner of the cross traversal-runner there is a radial runner inner pouring and riser communicating the casting cavity and the radial runner. The advantage of the pouring and riser system of this invention is that it avoids the slag inclusion defect caused by the high filling pressure flushing the mold surface. The porosity and pinhole defects caused by high filling speed are eliminated. Loosening or segregation defects due to insufficient feeding at the end of solidification are avoided. However, the cross traversal-runner of the mentioned patent invention has achieved good feeding effect in the casting of conical castings. However, if the cross traversal-runner is used for triangular castings or other castings with complicated structures, the time difference of molten metal reaching the far end of the castings is great, which results in the increase of casting defects. Therefore, the cross traversal-runner cannot be applied to the design of pouring and riser system for other castings with complicated structures, and cannot be directly applied to the development of thin-walled castings with complicated structures.

SUMMARY OF THE DISCLOSURE

In view of the deficiencies of the prior art, it is an object of the present disclosure to provide a method for collecting parameters for casting solidification simulation and a gridded design method for a pouring and riser system.

According to a first aspect of the present disclosure there is provided a method for collecting parameters for a solidification simulation of a large and complex thin-walled superalloy casting, comprising:

calculating a crystallization temperature interval and a dynamic viscosity curve as a function of temperature of a superalloy to obtain thermodynamic parameters of the superalloy;

obtaining cooling curves of the superalloy with different thickness, and obtaining, by conversion, heat transfer coefficients of interface between the casting and a formwork at different temperatures; and determining a linear expansion coefficient of the superalloy changing with temperature.

Preferably, obtaining cooling curves of the superalloy with different thickness comprises:

designing the casting as a plurality of step structures with different thicknesses and in a stepped distribution according to a wall thickness interval, and forming step castings with different thicknesses by pouring in the formwork;

arranging thermocouples in an interior of the step castings with different thicknesses, on an interface between the step casting and the formwork, and on a surface of the formwork, and collecting cooling curves of the interior of the step castings with different thicknesses, on the interface between the step casting and the formwork, and on the surface of the formwork.

Preferably, a number of steps is at least two.

According to a second aspect of the present disclosure, there is provided a gridded design method for a pouring and riser system of a large and complex thin-walled superalloy casting, wherein the collection method described above is used to obtain results of thermodynamic parameters, interfacial heat transfer coefficient and linear expansion coefficient, and the results are used to simulate a solidification process of tubular features with different thicknesses and to determine a feeding distance of the features with different thicknesses.

Preferably, the method comprises:

establishing a gridded pouring and riser system:

establishing a gridded pouring and riser system: placing the casting with a lowest center of gravity, wherein the casting is a large and complex thin-walled superalloy casting; dividing the casting into a plurality of modules according to the thickness, dividing each module into cells, and ensuring that the size of the cell is less than the thickness feeding distance; respectively arranging a plurality of conical pouring and risers on each module, wherein a diameter of a bottom of the conical pouring and riser is equal to a corresponding thickness of the module, a diameter of a top of the conical pouring and riser is 1.2-1.5 times the diameter of the bottom, and a height of the conical pouring and riser is equal to a diameter of the bottom; obtaining a maximum value $\Phi$ max of top diameters of all the conical pouring and risers, under a principle of shape compensation, selecting a cylinder with a diameter of the maximum value $\Phi$ max, taking a quadrilateral as a basic unit, and connecting tops of all the conical pouring and risers via the cylinder, so as to form a gridded pouring and riser system; and performing filling and solidification simulation on the casting and the gridded pouring and riser system in consideration of interaction between grids of the gridded pouring and riser system to obtain a defect simulation result of the casting.

Preferably, connecting tops of all the conical pouring and risers via the cylinder so as to form a gridded pouring and riser system comprises the following connection manners: connecting the conical pouring and risers, located at corners, of all the modules with two nearest-neighbouring conical pouring and risers via the cylinder; connecting the conical pouring and risers, located at side edges, of all the modules with three nearest-neighbouring conical pouring and risers via the cylinder, and connecting the conical pouring and riser, located at a middle part, of all the modules with four nearest-neighbouring conical pouring and risers via the cylinder; and thereafter, if there is still a defect in this part, connecting the conical pouring and risers, located at the corners, and next-nearest-neighbouring conical pouring and risers via the cylinder.

Preferably, the method comprises: after performing filling and solidification simulation on the casting and the gridded pouring and riser system, analyzing defect simulation results obtained, adjusting a top size, a cylinder size and connection manner of all the conical pouring and risers of the gridded riser system, optimizing feeding and constraint action of the gridded riser system, and repeating the simulation until the simulated defect is less than design requirement.

Preferably, performing filling and solidification simulation on the casting and the gridded pouring and riser system comprises: determining the feeding distance of tubular castings of different thickness by performing simulation on the tubular castings of different thickness.

Preferably, the method further comprises, after establishing a gridded pouring and riser system and prior to performing filling and solidification simulation on the casting and the gridded pouring and riser system: collecting the centre of gravity of the overall structure of the casting and the filling system by using finite element software analysis, and placing a main runner inlet at the centre of gravity; the main runner adopts a cylindrical structure, the main runner is connected to the cylinder of the gridded pouring and riser system, and the main runner conducts the molten metal from the smelting crucible to the gridded pouring and riser system.

Preferably, performing filling and solidification simulation on the casting and the gridded pouring and riser system in consideration of interaction between grids of the gridded pouring and riser system comprises performing the filling and solidification simulation of the casting and the gridded pouring and riser system with help of ProCAST finite element software.

Compared to the prior art, the present disclosure has at least one of the following advantageous effects.

The above-mentioned collection method of the present disclosure, combined with the thermophysical property calculation of a superalloy and the experimental test to obtain a thermophysical performance parameter, overcomes the inaccuracy caused by the previous empirical setting of simulation boundary conditions, and ensures the reliability of the simulation results of filling and solidification of a casting.

According to the gridded design method for the pouring and riser system of the present disclosure, the idea of "using shape compensation, changing enlargement into reduction, changing complexion into simplification, and changing highness into lowness" is adopted. Specifically, the main structure of the pouring and riser system is designed using shape compensation, the large casting structure is divided into modules to form a gridded complex structure, and the pressure head is kept from high to low. While the feeding distance is determined based on the solidification process simulation, the interaction between the grids is fully considered. On this basis, by means of repeated iteration of the casting finite element simulation, the shrinkage porosity defect is minimized while the dimensional accuracy of the casting is improved. In addition, these advantages are unparalleled by existing semi-empirical pouring and riser system design methods.

BRIEF DESCRIPTION OF THE DRAWINGS

Other features, objects and advantages of the disclosure will become more apparent from reading the detailed description of non-limiting embodiments with reference to the following drawings.

Figure 1:
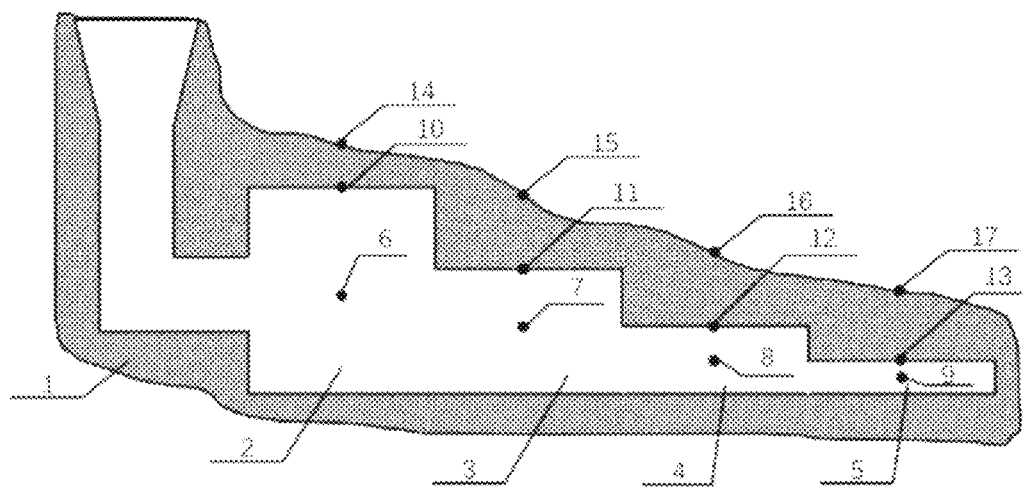
FIG. 1 is a method for collecting parameters for a solidification simulation of a large and complex thin-walled superalloy casting according to a preferred embodiment of the present disclosure.

The reference numbers in the drawing are indicated as: 1 is a formwork, 2 is a first step, 3 is a second step, 4 is a third step, 5 is a fourth step, 6 is a first thermocouple, 7 is a second thermocouple, 8 is a third thermocouple, 9 is a fourth thermocouple, 10 is a fifth thermocouple, 11 is a sixth thermocouple, 12 is a seventh thermocouple, 13 is an eighth thermocouple, 14 is a ninth thermocouple, 15 is a tenth thermocouple, 16 is an eleventh thermocouple, and 17 is a twelfth thermocouple.

DETAILED DESCRIPTION OF THE DISCLOSURE

Hereinafter, the present disclosure will be described in detail with reference to specific examples. The following examples will aid those skilled in the art in further understanding of the present disclosure, but do not limit the disclosure in any way. It should be noted that several variations and modifications can be made by a person skilled in the art without departing from the inventive concept. These are all within the scope of the present disclosure.

In a preferred embodiment of the disclosure, a method for collecting parameters for a solidification simulation of a large and complex thin-walled superalloy casting comprises:

S1. calculating a crystallization temperature interval and a dynamic viscosity curve as a function of temperature of a superalloy to obtain thermodynamic parameters of the superalloy. Preferably, a crystallization temperature interval, a thermal conductivity, a dynamic viscosity and a linear expansion coefficient of the superalloy can be calculated by using the thermodynamic calculation software JMaPro to obtain the crystallization temperature interval and the dynamic viscosity curve as a function of temperature.

S2, obtaining cooling curves of the superalloy with different thickness, and obtaining, by conversion, heat transfer coefficients of interface between the casting and a formwork at different temperatures.

S3, determining a linear expansion coefficient of the superalloy changing with temperature. Preferably, the coefficient of linear expansion of the superalloy can be measured using a thermal expansion instrument.

In other preferred embodiments, obtaining cooling curves for castings with different thicknesses includes: designing the casting as a plurality of step structures with different thicknesses and in a stepped distribution according to a wall thickness interval, and forming step castings with different thicknesses by pouring in the formwork. The step casting may be cast using a conventional investment casting process. For example, referring specifically to FIG. 1, according to the wall thickness interval of large and complex thin-walled superalloy castings, four-step castings with different thicknesses are designed, namely, a first step 2 with a thickness of 20 mm, a second step 3 with a thickness of 10 mm, a third step 4 with a thickness of 5 mm and a fourth step 5 with a thickness of 2 mm.

Thermocouples are arranged in the interior of the step casting with different thicknesses, the interface between the step casting and the formwork, and the surface of the formwork, and a computer can be used to collect the cooling curves of the interior of the step casting with different thicknesses, the interface between the step casting and the formwork, and the surface of the formwork. In general, there is a great difference in cooling rate of different parts of real castings, which leads to a great difference in temperature of different thickness parts at different time. The heat transfer coefficient between castings and formwork is closely related to temperature. The cooling curves of different parts can be collected by arranging thermocouples, and the boundary conditions and heat transfer coefficient setting of simulation process can be optimized to improve simulation accuracy. With reference to FIG. 1, the thermocouples are distributed in the interior of the step castings with different thicknesses, on the interface between the step casting and the formwork 1 and on the formwork 1 in the following manner: arranging thermocouples in the interior of the casting steps with different thicknesses, and respectively arranging a first thermocouple 6, a second thermocouple 7, a third thermocouple 8 and a fourth thermocouple 9 in the interior of the first step 2, the second step 3, the third step 4 and the fourth step 5; arranging a fifth thermocouple 10, a sixth thermocouple 11, a seventh thermocouple 12 and an eighth thermocouple 13 respectively at the interface between each step casting and the formwork 1, and a ninth thermocouple 14, a tenth thermocouple 15, an eleventh thermocouple 16 and a twelfth thermocouple 17 respectively on the surface of the formwork 1 corresponding to each step casting.

In another embodiment of the present disclosure, there is provided a gridded design method for a pouring and riser system of a large and complex thin-walled superalloy casting, the method comprising that: the results of thermodynamic parameters, interfacial heat transfer coefficient and linear expansion coefficient obtained by the above-mentioned collection method are imported into ProCAST casting simulation software to simulate the solidification process of tubular features with different thicknesses, and determine the feeding distance of the features with different thicknesses, so that the parameters used in the simulation are closer to the real environment of engineering practice, thus ensuring the reliability of the simulation results.

In other partially preferred embodiments, the gridded design method for a pouring and riser system of a large and complex thin-walled superalloy casting may include the steps of:

S1: establishing a gridded pouring and riser system:

Based on the principle of changing highness into lowness, the large and complex thin-walled superalloy castings is placed with a lowest center of gravity. Based on the idea of changing enlargement into reduction and changing complexion into simplification, the casting is divided into a plurality of modules according to the thickness, each module is divided into cells, and it is ensured that the size of the cell is less than the thickness feeding distance. Otherwise, the feeding would be insufficient and shrinkage and porosity would be generated. A plurality of conical pouring and risers are respectively arranged on different modules, and the plurality of conical pouring and risers are respectively located at four corners of each module. The diameter of the bottom of the conical pouring and risers is equal to the thickness of the corresponding part. A diameter of a top of the conical pouring and riser is 1.2-1.5 times the diameter of the bottom, and a height of the conical pouring and riser s equal to a diameter of the bottom. Statistical analysis is performed on the top diameter of the conical pouring and riser, and a maximum value ($\Phi$ max) of top diameters of all the conical pouring and risers is obtained. Under a principle of shape compensation, a cylinder with a diameter of the maximum value ($\Phi$ max) is selected, a quadrilateral is taken as a basic unit, and tops of the conical pouring and risers of all the modules are connected via the cylinder, so as to form a gridded pouring and riser system.

As a preferred method, connecting tops of all the conical pouring and risers via the cylinder so as to form a gridded pouring and riser system comprises the following three connection manners, wherein the first connection manner is to connect each conical pouring and riser, located at a corner, of the module with two nearest-neighbouring conical pouring and risers via the cylinder; the second connection manner is to connect each conical pouring and riser, located at a side edge, of the module with the nearest-neighbouring three conical pouring and risers via the cylinder; and the third connection manner is to connect each conical pouring and riser, located at a middle part, of the module with the nearest-neighbouring four conical pouring and risers via the cylinder. If there is still a defect in this part, on the basis of the three kinds of connections, the connection of the next-nearest conical pouring and risers is further added, and then each conical pouring and riser, located at the corner, is connected with the next-nearest two conical pouring and risers via the cylinder.

S2: fully considering the interaction between the grids of the gridded pouring and riser system, and simulating the filling and solidification of the superalloy casting and the gridded pouring and riser system by using ProCAST casting simulation software (finite element software), and obtaining the defect simulation results of superalloy castings.

In other preferred embodiments, after performing filling and solidification simulation on the super alloy casting and the gridded pouring and riser system, the method further comprises: analyzing the resulting defect simulation results, and adjusting the dimensions of the gridded pouring and riser system (the dimension of the top of the conical pouring and riser and the dimension of the cylinder) and the connection (the connection manner of the conical pouring and riser riser). When the simulation results show that there are a lot of local defects, on the basis of the three connections, the connection with the next-nearest conical pouring and risers is added, and then each conical pouring and riser, located at the corner, is connected with the next-nearest two conical pouring and risers via the cylinder. The feeding and constraint functions of gridded pouring and riser system are optimized and iterated until the simulation defects of the castings are less than the design requirements.

In other partially preferred embodiments, prior to establishing the gridded casting system, the method comprises: using a finite element software to analyze a centre of gravity of an overall structure of the large and complex thin-walled superalloy casting and a filling system, and selecting the position of the center of gravity as an entrance of the main runner. The main runner is cylindrical. A diameter of the cylindrical main runner is 3 times $\Phi$ max (the maximum value of the diameter of the top of the conical pouring and riser), and a height of the cylindrical main runner is 200-300 mm.

The above-mentioned embodiments provide a gridded design method for a pouring and riser system of a large and complex thin-walled superalloy casting in view of the deficiencies in the existing pouring and riser system design of large and complex thin-walled superalloy castings, so as to provide support for the development of large and complex thin-walled superalloy castings in aerospace field with high dimensional accuracy and good internal quality, and also provide solutions for casting engineers to develop diverse pouring and riser system designs for complex thin-walled superalloy castings.

Based on the method described above, details of implementation are further described below in connection with specific application examples, but these details are not intended to limit the present disclosure.

In an application example, taking a round aero-engine casing casting as an example, the parameter collection method for solidification simulation of the above-mentioned large and complex thin-walled superalloy casting and the gridded design method for a pouring and riser system of a large and complex thin-walled superalloy casting are further illustrated. The casing casting is precision formed from K4169 superalloy with a diameter of 1360 mm, a height of 300 mm and a minimum wall thickness of 2 mm. Specifically, the parameter collection method for solidification simulation of K4169 superalloy casing casting includes:

M101, calculating crystallization temperature interval and dynamic viscosity curves of the K4169 superalloy via JMat-Pro thermodynamics calculation software M101.

M102, obtaining the cooling curves of K4169 superalloy at different thicknesses, and obtaining, through conversion, the interfacial heat transfer coefficient at different temperatures between casting and formwork. The cooling curves of K4169 superalloy casing casting with different thicknesses are obtained by using four-step casting in the K4169 superalloy casing casting, which are converted into the heat transfer coefficients of K4169 superalloy casing casting and formwork at different temperatures.

M103, measuring the linear expansion coefficient of K4169 superalloy via thermal dilatometer.

This embodiment also provides a gridded design method for a pouring and riser system of a superalloy casing casting, based on the above-mentioned embodiment, to obtain the thermodynamic parameters, heat transfer coefficient and linear expansion coefficient of the superalloy, comprising:

M201, bringing various coefficients and curves obtained above into ProCAST simulation software to determine the feeding distance, simulating the solidification process of tubular features with different thicknesses, and determining the feeding distance of features with different thicknesses; and simulating filling and solidification process of the large and complex thin-walled superalloy casting.

Based on the principle of changing highness into lowness, the K4169 superalloy casing casting is laid flat according to the principle of placing with a lowest center of gravity. Based on the idea of changing enlargement into reduction and changing complexion into simplification, the module of the casing casting is divided into modules according to the thickness, including a flange with a thick wall, a side wall with a medium wall thickness and a support plate with a thin wall, and an interior of each module is divided into cells according to the rule that the cell size is smaller than the three types of thickness feeding distances. After the conical pouring and riser is arranged on the three modules, the diameter of the bottom of the conical pouring and riser is equal to the corresponding thickness of the three modules, the diameter of the top of the conical pouring and riser is 1.35 times that of the bottom, and the height is equal to the diameter of the bottom. Statistical analysis is performed on the top diameter of the above-mentioned conical pouring and riser to obtain a maximum diameter size of 30 mm. Based on the principle of shape compensation, a cylinder with a 30 mm diameter is selected, and a quadrilateral is used as the basic unit to connect the tops of all the conical pouring and risers to form a gridded pouring and riser system. The center of gravity of the overall structure of the K4169 superalloy casing casting and filling system is analyzed by finite element software, and it is found that the center of gravity is the center of the casing. The central position is selected as the main runner entrance, with a cylindrical main runner of a diameter of 90 mm. The height is 270 mm.

M202, based on the interaction between grids, the filling and solidification of K4169 superalloy casing casting and its pouring and riser system are simulated by ProCAST finite element software. The simulation results of defects are analyzed. The size and connection mode of the gridded pouring and riser system are adjusted to optimize the feeding and constraint performance of the grids. Iteration is repeated until the defects of simulated flange position are less than grade III, and the defects of side wall and support plate are less than grade I.

With the pouring and riser system designed with the above-mentioned method, after wax pressing, shell making and casting, the internal quality of the K4169 superalloy casing casting is found to meet the design requirements, the dimensional accuracy of the casting is CT6 grade, and the production rate is increased by 30% compared with the conventional design method. In addition, as a comparative study, parameters such as thermodynamic parameters, linear expansion coefficients and recommended heat transfer coefficients of the ProCAST software system are also used to simulate the above-mentioned pouring and riser system. It is found that the difference between the simulation results with the parameters of the software and the experimental results is greater than that with the parameters collected by the method of the present disclosure, indicating that the present disclosure can be better used in the pouring and riser system design of circular superalloy castings.

In another application example, taking a square thin-walled superalloy casting as an example, the method for collecting parameters for a solidification simulation of a large and complex thin-walled superalloy casting and the gridded design method for a pouring and riser system of a large and complex thin-walled superalloy casting in the above-mentioned embodiment are further explained. The superalloy casting adopts K447A superalloy precision forming, with a length of 350 mm, a height of 260 mm and a wall thickness of 2.5 mm, is a special-shaped thin-walled part, and has a C-shaped structure, which mainly has two thickness dimensions, namely a boss of 5 mm and a skin of 2.5 mm. Specifically, the method for collecting parameters for solidification simulation of a square thin-walled K447A superalloy casting comprises:

M101, calculating the crystallization temperature interval and dynamic viscosity curves of superalloy M101 via JMatPro software.

M102, obtaining the cooling curves of the superalloy with different thicknesses, and obtaining, by conversion, the interfacial heat transfer coefficients at different temperatures between casting and formwork. The cooling curves of K447A superalloy with different thicknesses are obtained by using two-stage step casting, and the heat transfer coefficients between the casting and the formwork at different temperatures are obtained.

M103, measuring the linear expansion coefficient of K447A superalloy by thermal dilatometer.

This embodiment also provides a gridded design method for a pouring and riser system of a square thin-walled K447A superalloy casting, based on the above-mentioned embodiment to obtain the thermodynamic parameters, heat exchange coefficient and linear expansion coefficient of the superalloy, comprising:

M201, bringing various coefficients and curves obtained above into the ProCAST simulation software to determine the feeding distance, simulating the solidification process of tubular features with different thicknesses, and determining the feeding distance of features with different thicknesses; and simulating filling and solidification process of the large and complex thin-walled superalloy casting.

Based on the principle of changing highness into lowness, the square thin-walled superalloy casting is laid flat with a lowest center of gravity. Based on the idea of changing enlargement into reduction and changing complexion into simplification, the modules of the square thin-walled superalloy casting is divided into modules according to the thickness, i.e. two modules thick-walled boss and thin-walled skin. The two modules are divided into cells. The cell size should be smaller than the thickness feeding distance. According to the above-mentioned rule that the cell size shall be less than the feeding distance of these two thicknesses, after the conical pouring and risers are arranged on the two modules, the diameter of the bottom of the conical pouring and riser is equal to the corresponding thickness of the two modules, the diameter of the top of the conical pouring and riser is 1.2 times that of the bottom, and the height is equal to the diameter of the bottom. Statistical analysis is performed on the top diameter of the above-mentioned conical pouring and riser to obtain a maximum diameter size of 15 mm. Based on the principle of shape compensation, a cylinder with a diameter of 15 mm is selected, and a quadrilateral is used as the basic unit to connect the tops of all the cones above to form a gridded pouring and riser system. The center of gravity of the overall structure of the square thin-walled superalloy casting and the filling system is obtained by finite element software analysis, and the center of gravity is found to be the diagonal midpoint position of the square thin-walled superalloy casting, and the diagonal midpoint position is selected as the inlet of the main runner. The main runner adopts a cylindrical structure, the main runner is connected to the cylinder of the gridded pouring and riser system, and the main runner conducts the molten metal from the smelting crucible to the gridded pouring and riser system. The main runner can be cylindrical with the following parameters: the diameter is 45 mm. The height is 200 mm.

M202, fully considering the interaction between the grids, and, on this basis, further with the help of ProCAST finite element software, performing the filling and solidification simulation of the square thin-walled K447A superalloy casting and its pouring and riser system, and analyzing the simulation results of defects. The size and connection mode of the gridded pouring and riser system are adjusted to optimize the feeding and constraint effects of the grids, and iteration is repeated until the defects of the simulated boss position and skin position are less than grade I. With the pouring and riser system designed with the method, after wax pressing, shell making and casting forming, it is found that the internal quality of the square casting meets the design requirements, the dimensional accuracy of the casting is CT4 grade, and the production rate is increased by 40% compared with the conventional design method, indicating that the present disclosure is also applicable to the design of the pouring and riser system for square superalloy castings, and the present disclosure has universality in the pouring and riser system design.

Specific embodiments of the disclosure have been described above. It is to be understood that the present disclosure is not limited to the specific embodiments described above, and that various changes and modifications within the scope of the claims may be made by those skilled in the art without affecting the spirit of the present disclosure.

The invention claimed is:

1. A gridded design method for a pouring and riser system of a large and complex thin-walled superalloy casting, comprising:
    establishing a gridded pouring and riser system: placing the casting with a lowest center of gravity, wherein the casting is a large and complex thin-walled superalloy casting; dividing the casting into a plurality of modules according to different thicknesses, dividing each module into cells, and ensuring that a size of each cell is less than a thickness feeding distance; arranging a plurality of conical pouring and risers on each module, obtaining a maximum value Φ max of top diameters of all the conical pouring and risers, under a principle of shape compensation, selecting a cylinder with a diameter of the maximum value Φ max, taking a quadrilateral as a basic unit, and connecting tops of the conical pouring and risers of all the modules via the cylinder, so as to form a gridded pouring and riser system; and
    performing filling and solidification simulation on the casting and the gridded pouring and riser system in consideration of interaction between grids of the gridded pouring and riser system to obtain a defect simulation result of the casting.

2. The gridded design method for a pouring and riser system of a large and complex thin-walled superalloy casting according to claim 1, wherein a diameter of a bottom of the conical pouring and riser is equal to a corresponding thickness of the module, a diameter of a top of the conical pouring and riser is 1.2-1.5 times the diameter of the bottom, and a height of the conical pouring and riser is equal to a diameter of the bottom.

3. The gridded design method for a pouring and riser system of a large and complex thin-walled superalloy casting according to claim 2, wherein connecting tops of all the conical pouring and risers via the cylinder so as to form a gridded pouring and riser system comprises the following connection manners:
    connecting the conical pouring and risers, located at corners, of all the modules with two nearest-neighbouring conical pouring and risers via the cylinder;
    connecting the conical pouring and risers, located at side edges, of all the modules with three nearest-neighbouring conical pouring and risers via the cylinder, and connecting the conical pouring and riser, located at a middle part, of all the modules with four nearest-neighbouring conical pouring and risers via the cylinder; and
    thereafter, if there is still a defect in this part, connecting the conical pouring and risers, located at the corners, and next-nearest-neighbouring conical pouring and risers via the cylinder.

4. The gridded design method for a pouring and riser system of a large and complex thin-walled superalloy casting according to claim 1, after performing filling and solidification simulation on the casting and the gridded pouring and riser system, further comprising:
    analyzing the defect simulation result obtained, adjusting a top size, a cylinder size and connection manner of all the conical pouring and risers of the gridded riser system, optimizing feeding and constraint action of the gridded riser system, and repeating the simulation until the simulated defect is less than design requirement.

5. The gridded design method for a pouring and riser system of a large and complex thin-walled superalloy casting according to claim 1, after establishing the gridded pouring and riser system and prior to performing filling and solidification simulation on the casting and the gridded pouring and riser system, further comprising:
    using a finite element software analysis to obtain a center of gravity of an overall structure of the casting and a filling system, placing a main runner inlet at the center of gravity with a main runner being a cylindrical structure, connecting the main runner to the cylinder of the gridded pouring and riser system, and conducting, by the main runner, molten metal from a smelting crucible to the gridded pouring and riser system.

6. The gridded design method for a pouring and riser system of a large and complex thin-walled superalloy casting according to claim 1, wherein performing filling and solidification simulation on the casting and the gridded pouring and riser system in consideration of interaction between grids of the gridded pouring and riser system comprises performing the filling and solidification simulation of the casting and the gridded pouring and riser system with help of ProCAST finite element software.

7. The gridded design method for a pouring and riser system of a large and complex thin-walled superalloy casting according to claim 1, further comprising
    calculating a crystallization temperature interval and a dynamic viscosity curve as a function of temperature of a superalloy to obtain thermodynamic parameters of the superalloy;
    obtaining cooling curves of the superalloy with different thickness, and obtaining, by conversion, heat transfer coefficients of interface between the casting and a formwork at different temperatures; and
    determining a linear expansion coefficient of the superalloy as a function of temperature.

8. The gridded design method for a pouring and riser system of a large and complex thin-walled superalloy casting according to claim 7, wherein "obtaining cooling curves of the superalloy with different thickness" comprises:
    designing the casting as a plurality of step structures with different thicknesses and in a stepped distribution according to a wall thickness interval, and forming step castings with different thicknesses by pouring in the formwork;
    arranging thermocouples in an interior of the step castings with different thicknesses, on an interface between the step casting and the formwork, and on a surface of the formwork, and collecting cooling curves of the interior of the step castings with different thicknesses, on the interface between the step casting and the formwork, and on the surface of the formwork.

9. The gridded design method for a pouring and riser system of a large and complex thin-walled superalloy casting according to claim 8, wherein a number of steps is at least two.

\* \* \* \* \*